Jan. 15, 1929.  W. J. BELL  1,699,043
REAR VISION MIRROR
Filed April 11, 1927
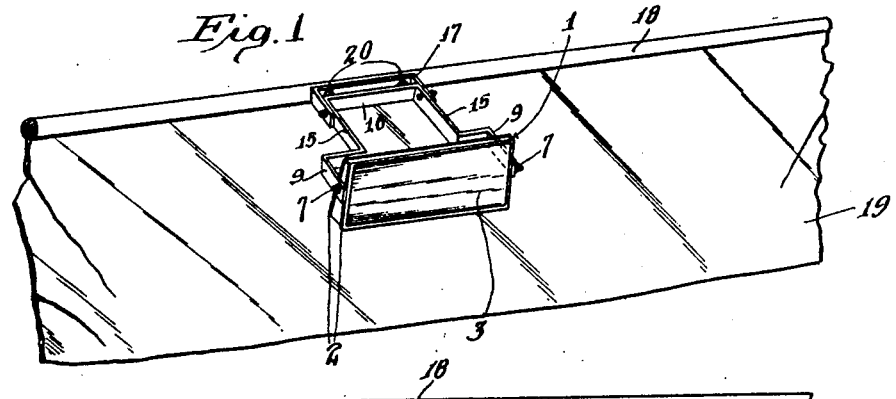
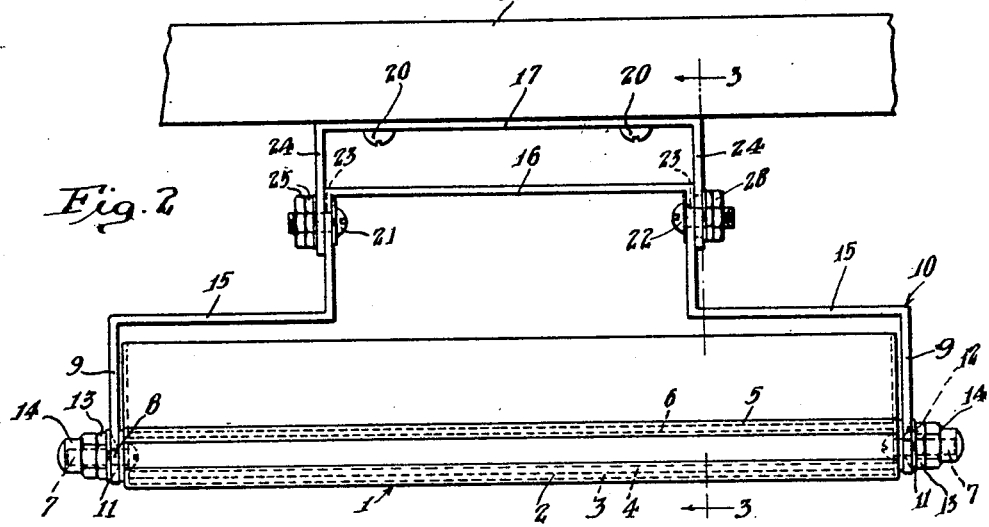
Inventor
Walter Joel Bell
By Lyon & Lyon
Attorneys Patented Jan. 15, 1929.

1,699,043

UNITED STATES PATENT OFFICE.

WALTER JOEL BELL, OF LOS ANGELES, CALIFORNIA.

REAR-VISION MIRROR.

Application filed April 11, 1927. Serial No. 182,621.

This invention relates to rear vision mirrors, and is more particularly directed to a rear vision mirror adapted to be secured in position in a motor vehicle to enable the driver thereof to see what is on the road behind him.

Rear vision mirrors are now in use, and as usually constructed comprise merely a mirror which is adjustably secured to the frame of the windshield of a motor vehicle so as to permit the driver of the motor vehicle to see what is on the road behind him. These plain mirrors as now used are adequate to give the driver a good view of what is at the rear of his car in daylight, and also enable the driver to judge fairly accurately the distance behind him on the road of other automobiles or objects, but at night when the lights of vehicles are burning, a glare is produced in such a manner which makes the use of such rear vision mirrors unpleasant to the driver of the vehicle and also renders impossible the accurate judging of distance to the rear of the motor vehicle.

It is therefore an object of this invention to provide a rear vision mirror adapted to be secured to the frame of the windshield of a motor vehicle, and which includes a plain mirror, by means of which the driver of the motor vehicle may view and accurately judge the distance of other motor vehicles or objects to the rear of his car, and a second mirror which is adapted to be used at night and is provided with means for preventing the glare of the motor vehicle lights into the driver's eyes.

Another object of this invention is to provide a rear vision mirror including a frame, a mirror mounted in the frame, and a second mirror formed at the rear of the first mirror, and means mounted in advance of the second mirror for preventing glare of lights from the second mirror.

Another object of this invention is to provide simple and inexpensive means of mounting the rear vision mirror embodying this invention.

Other objects and advantages of this invention it is believed will be apparent from the following detailed description of a preferred embodiment thereof, as illustrated in the accompanying drawings.

In the drawings:—

Figure 1 is a perspective view of a rear vision mirror embodying this invention, illustrating the same as attached to a fragment of a windshield.

Figure 2 is a top plan view of the rear vision mirror illustrated in Fig. 1.

Figure 3 is a sectional end elevation of a rear vision mirror embodying this invention.

In the drawings, 1 illustrates a frame, formed around its edges with a bead 2 within which a mirror 3 is mounted. The mirror 3 is a plain mirror. Mounted in the frame 1, to the rear of the mirror 3, is a second mirror 4 which likewise may be a plain mirror. The frame 1 is also provided with a second bead 5 around its inner periphery to hold a portion of colored glass 6 in inclined position in the frame 1. The colored glass 6 is preferably held spaced from the mirror 4 in the frame 1. The frame 1 is provided at its opposite ends with trunnions 7 which are adapted to be inserted into slots 8 formed in the outwardly extending arms 9 of the bracket 10.

Means are provided for holding the trunnions 7 within the slots 8 so as to permit the frame 1 to be rotated to the proper position to permit the operator of the motor vehicle to see the road behind him, which means preferably comprise beveled washers 11 which are adapted to be inserted into countersunk recesses 12 formed around the slots 8 in the portions 9 of the bracket 10. A nut 13 is screw-threaded to each of the trunnions 7 in position to engage the washers 11, and a second or lock nut 14 is screw-threaded to the trunnions 7 to engage the nuts 13.

Means are provided for securing the bracket 10 to the frame of the windshield of a motor vehicle, which means are preferably of the following construction:—The bracket 10 is formed with transversely extending portions 15 which extend at right angles to the arms 9 and which terminate at the U-shaped portion 16 of the bracket 10. The U-shaped portion 16 fits within a clamp bracket 17 which is adapted to be secured to the frame piece 18 of the windshield 19 of the motor vehicle by means of screws or bolts 20. The U-shaped portion is provided with screws 21 and 22. The screw 21 passes through an aperture 23 formed in the outwardly extending arm 24 of the clamp bracket 17 and is provided with a pair of nuts 25 for securing the same in position to hold the bracket 10 in position after the same has been adjusted within the clamp bracket 17 to the proper position to permit the driver of the motor vehicle to view through the mirrors mounted in the frame 1, through the rear opening or glass of the top of the motor vehicle, the road to the rear of the same. The screw 22 passes through an elongated slot 26 formed in the outwardly extending arm 24 of the clamp bracket 17, and is likewise provided with lock means 28 for securing this end of the bracket 10 in adjusted position. The screw 22 being fitted within the slot 26 permits the mirrors mounted within the frame 1 to be adjusted at an angle in a horizontal or substantially horizontal plane to permit the driver of the motor vehicle to correctly adjust the same so that he may see, by means of the mirrors mounted within the frame 1, from the driving position of the motor vehicle through the rear opening or glass formed in the top of the motor vehicle, the road to the rear of the same.

The mirror 3 is a plain mirror, and when driving in the daytime, the driver of the motor vehicle rotates the frame 1 in the bracket 10 to adjust the mirror 3 to the position to permit him a direct vision of the road to the rear of the motor vehicle. When driving at night, and in order to avoid the glare of other motor vehicle lights in a mirror such as the mirror 3, the driver rotates the frame 1 in the bracket 10 so as to adjust the rear vision mirror 4 to position to permit him to view the road to the rear of his vehicle. The colored glass 6 avoids the glare from the motor vehicle lights and permits the operator of the motor vehicle to view the road to the rear of his vehicle through the colored glass 6 and mirror 4 without having the glare of the motor vehicle lights to the rear of his motor vehicle shine in his eyes. In order to avoid the glare, and depending upon the amount of glare which the driver finds is normally produced by the motor vehicle lights to the rear of his motor vehicle, he may adjust the frame 1 in the bracket 10 to any one of four positions to give the following reflections, images or rear visions: The frame 1 adjusted to the first position, the operator of the motor vehicle will have a view to the rear of his motor vehicle by a direct reflection from the surface of the colored glass 6, giving the motor vehicle driver the least degree of glare prevention of the three positions to which the frame 1 may be adjusted, and also giving a true color reflection of the image. By adjusting the frame 1 to the second position, the motor vehicle driver obtains a rear vision by a reflection from the rear surface 29 of the colored glass 6, giving him a further degree of glare prevention.

By adjusting the frame 1 to a third position, the driver of the motor vehicle obtains a rear vision by means of a reflection from the surface 30 of the mirror 4, looking through the colored glass 6 to the surface 30, and by reflection back through the colored glass 6 to the rear of the motor vehicle, thereby obtaining a greater degree of glare prevention. By adjusting the frame 1 to the fourth position, the driver of the motor vehicle obtains a rear vision by means of a reflection from the rear surface of the mirror 4, looking through the colored glass and through the glass in the mirror 4 to the rear surface of the mirror 4, and by reflection back through the colored glass 6 to the rear of the vehicle, producing a fourth image of the object to the rear of the vehicle, thereby obtaining the maximum degree of glare prevention. The adjustability of the frame 1 to the three positions is important in order to overcome different light conditions, to permit the driver of the motor vehicle to obtain a means of accurately judging the distance and position of objects to the rear of his motor vehicle, such, for example, as an accurate means of judging the distance at which a second motor vehicle is traveling behind him.

Having fully described my invention, it is to be understood that I do not wish to be limited to the details of construction herein set forth, which may obviously be varied without departing from the spirit of my invention, as defined by the appended claims.

I claim:—

1. In a rear vision mirror, the combination of an adjustable frame, a plain rear vision mirror mounted within the frame, reflector means mounted at the rear of the plain vision mirror, and glare preventing means mounted in the frame in advance of and at an angle to the reflector means, said glare preventing means and the reflector being in fixed relation and tiltable as a unit to give different color tone reflections of the same object.

2. In a rear vision mirror, the combination of an adjustable frame, a plain mirror mounted in the frame, reflector means mounted to the rear of the mirror in the frame, and a colored glass fixedly mounted in the frame in advance of and at an angle to the reflector means.

3. In a rear vision mirror, the combination of a frame, a plain mirror mounted in the frame, reflector means mounted at the rear of the mirror, glare preventing means mounted in the frame at an angle to the reflector means, and means for adjustably mounting the frame in position.

4. In a rear vision mirror, the combination of a reflector means, and glare preventing means fixedly mounted in advance of and at an angle to the reflector means and adjustable therewith to different angles of observation for reflections from the one object.

5. In a rear vision mirror, the combination of a frame, a reflector means mounted in the frame, glare preventing means mounted in advance of and at an angle to the reflector means, a supporting bracket, and means for adjustably securing the frame in the bracket to permit adjustment of the frame to different positions to form different images of the same object.

6. In a rear vision mirror, the combination of a frame, a reflector means mounted in the frame, a colored glass mounted in advance of and at angle to the reflector means, a supporting bracket, and means for adjustably securing the frame in the bracket to permit adjustment of the frame to different positions to produce different images of the same object.

7. In a rear vision mirror, the combination of a frame, a plain mirror mounted within the frame, reflector means mounted in the frame at the rear of the plain mirror, glare preventing means mounted in the frame in advance of and at an angle to the reflector means, a supporting bracket, and means for adjustably securing the frame in the bracket to permit adjustment of the frame to different positions to produce different images of the same object.

8. In a rear vision mirror, the combination of a frame, a plain mirror mounted in the frame, reflector means mounted in the frame to the rear of the mirror, a colored glass mounted in advance of and at an angle to the reflector means, a supporting bracket, and means for adjustably securing the frame in the bracket to permit adjustment of the frame to different positions to produce different images of the same object.

Signed at Los Angeles, California, this 25 day of March, 1927.

WALTER JOEL BELL.